(12) United States Patent
Jacob et al.

(10) Patent No.: US 11,954,423 B2
(45) Date of Patent: Apr. 9, 2024

(54) SINGLE-ACTION ELECTRONIC REPORTING

(71) Applicant: SAP SE, Walldorf (DE)

(72) Inventors: Daphne Jacob, Bangalore (IN); Natasha Robinson, Brighton (GB)

(73) Assignee: SAP SE, Walldorf (DE)

( * ) Notice: Subject to any disclaimer, the term of this patent is extended or adjusted under 35 U.S.C. 154(b) by 142 days.

(21) Appl. No.: 17/517,165

(22) Filed: Nov. 2, 2021

(65) Prior Publication Data
US 2023/0076983 A1 Mar. 9, 2023

(30) Foreign Application Priority Data
Aug. 28, 2021 (IN) .............................. 202111039057

(51) Int. Cl.
  G06F 40/166 (2020.01)
  G06F 3/0482 (2013.01)
  G06F 16/34 (2019.01)
  G06F 16/383 (2019.01)

(52) U.S. Cl.
  CPC .......... *G06F 40/166* (2020.01); *G06F 3/0482* (2013.01); *G06F 16/345* (2019.01); *G06F 16/383* (2019.01)

(58) Field of Classification Search
  CPC .... G06F 16/383; G06F 40/166; G06F 16/345; G06F 3/0482
  See application file for complete search history.

(56) References Cited

U.S. PATENT DOCUMENTS

| | | | |
|---|---|---|---|
| 2005/0131737 A1* | 6/2005 | Joseph | G16H 10/60 705/2 |
| 2007/0033104 A1* | 2/2007 | Collins | G06Q 30/0251 705/14.41 |
| 2010/0324748 A1* | 12/2010 | Voysey | G06Q 50/16 705/412 |
| 2011/0295618 A1* | 12/2011 | Naipaul | G16H 10/60 705/2 |
| 2017/0270168 A1* | 9/2017 | Smith | G06F 40/279 |
| 2018/0062938 A1* | 3/2018 | Garrison | H04L 43/14 |
| 2021/0272216 A1* | 9/2021 | Rodehorst | G06Q 30/018 |
| 2022/0183571 A1* | 6/2022 | Johnson | A61B 5/742 |

\* cited by examiner

*Primary Examiner* — Andrea C Leggett
(74) *Attorney, Agent, or Firm* — Fountainhead Law Group P.C.

(57) ABSTRACT

Programs, systems, and methods for generating electronic reports by a single-action electronic reporting system are described herein. In some embodiments, electronic reporting documents may be generated based on a configuration file. The configuration file may be editable by the user such that the user may select report data types and cumulation data types to be applied to the configuration file for a particular sub-application format. All personnel data associated with employees of a company may be stored such that the personnel data may be accessed and obtained by the single-action electronic reporting system. The user may define the data types, the cumulation data types, and the sub-application for output and presentation of the data.

20 Claims, 13 Drawing Sheets

200

Single Action Electronic Reporting Engine

202 — ⊕ ▣ ▶

SELECTIONS FROM | ⇨ SEARCH HELPS

PERIOD

| AREA | ☑ | FROM | 01.04.2021 | TO | 30.04.2021 |

204 — ○ CURRENT PERIOD
206 — ⦿ OTHER PERIOD
208 —

SELECTION

210 — PERSONNEL NUMBER
212 — AREA
214 —

INTERVAL

216 — INTERVAL PERIOD | TO
218 — PERIOD

PERIOD DETERMINATION

220 — ⦿ IN-VIEW PERIODS
222 — ○ FOR-VIEW PERIODS
224 —

OTHER SELECTIONS

226 — SUB-APPLICATION
228 — CUMULATION DATA TYPE | TO
230 — ☐ ARCHIVED RESULTS
232 — ☐ DISPLAY RECS WITH NULL VALUES
234 —

OUTPUT

236 — LEVEL DATA | COMPARISON DATA — 244
238 — SUMMARY | COMPARISON SUMMARY — 246
240 — TOTALS | COMPARISON TOTALS — 248
242 —

| Sub-Application A | Cumulation Data Type 1 | Data Type 1 |
| | | Data Type 2 |
| | | Data Type 3 |
| | | Data Type 4 |
| | Cumulation Data Type 2 | Data Type 5 |
| | | Data Type 6 |
| | | Data Type 9 |
| | Cumulation Data Type 3 | Data Type 1 |
| | | Data Type 6 |
| | | Data Type 7 |
| | | Data Type 8 |
| Sub-Application B | Cumulation Data Type 1 | Data Type 9 |
| | | Data Type 2 |
| | | Data Type 3 |
| | | Data Type 4 |
| | Cumulation Data Type 2 | Data Type 5 |
| | | Data Type 11 |
| | | Data Type 12 |
| | Cumulation Data Type 3 | Data Type 6 |
| | | Data Type 13 |
| | | Data Type 5 |
| | | Data Type 14 |

Display View Specification for Cumulation Data Types — 314

Monthly Wages and Salaries Survey — 316

| Cumul. DT | Info | Cumulation DT text |
|---|---|---|
| AWPY | 🔑 | Awards |
| BOPY | 🔑 | Bonus |
| FTPY | 🔑 | Furlough with Top up |
| GRPY | 🔑 | Gross Pay |
| HOPY | 🔑 | Holiday Pay |
| OVPY | 🔑 | Overtime |

| HCM Local. Subapplication | [08] MWSS 322 | | | | |
|---|---|---|---|---|---|
| ASSIGNMENT OF DATA TYPES TO CUMULATION DATA... | | | | 324 326 | 328 |
| CUMUL. DT | DATA TY... | START DATE | END DATE | ARITHMETIC SYMBOL | AMOUNT, NUMBER OR RATE |
| BOPY | 9100 | 01.01.2020 | 31.12.9999 | ADDITION | ▷ AMOUNT OUT OF PAYROLL RESUL... |
| BOPY | 9102 | 01.01.2020 | 31.12.9999 | ADDITION | ▷ AMOUNT OUT OF PAYROLL RESUL... |
| FTPY | 08FU | 01.01.2021 | 31.12.9999 | ADDITION | ▷ AMOUNT OUT OF PAYROLL RESUL... |
| GRPY | M010 | 01.01.2020 | 31.12.9999 | ADDITION | ▷ AMOUNT OUT OF PAYROLL RESUL... |
| GRPY | M110 | 01.01.2020 | 31.12.9999 | ADDITION | ▷ AMOUNT OUT OF PAYROLL RESUL... |
| OVPY | W012 | 01.01.2020 | 31.12.9999 | ADDITION | ▷ AMOUNT OUT OF PAYROLL RESUL... |
| OVPY | W014 | 01.01.2020 | 31.12.9999 | ADDITION | ▷ AMOUNT OUT OF PAYROLL RESUL... |
| OVPY | W016 | 01.01.2020 | 31.12.9999 | ADDITION | ▷ AMOUNT OUT OF PAYROLL RESUL... |

FIG. 3D

| MWSS LEVEL 1 | | 402 → | | | | | | | | | | | | |
|---|---|---|---|---|---|---|---|---|---|---|---|---|---|---|
| PERS.NO. | NAME | NI NUMBER | PAYROLL AREA TEXT | PAYMENT DATE | PAY SCALE TEXT | PS AREA TEXT | PS GROUP | LV | SUBAPP. | CUMUL.WT | CUMULATION D/T TEXT | D/T | DATA TYPE LONGTEXT | AMOUNT | NUMBER | RATE | CRCY |
| 20208001 | MR BARRY CARR | NR3:1235B | HR-GB: MONTHLY(NR) | 26.06.2021 | STANDARD CONTRACT | REST OF U.K. | GRD03 | 1 | MWSS | FTPY | FURLOUGH WITH TOP-UP | 08FU | FURLOUGHED PAYMENT 80% | 1.500,00 | 0,00 | 0,00 | GBP |
| 20208001 | MR BARRY CARR | NR3:1235B | HR-GB: MONTHLY(NR) | 26.06.2021 | STANDARD CONTRACT | REST OF U.K. | GRD03 | 1 | MWSS | BOPY | BONUS | 9102 | ANNUAL BONUS | 5.000,00 | 0,00 | 0,00 | GBP |
| 20211040 | MR PETER PICKLE | NR2:3434B | HR-GB: MONTHLY(NR) | 26.06.2021 | STANDARD CONTRACT | REST OF U.K. | GRD04 | 2 | MWSS | GRPY | GROSS PAY | M010 | MONTHLY SALARY (IND.EVAL) | 2.750,00 | 0,00 | 0,00 | GBP |
| 20211045 | MISS DORIS SMALL | NR6:5556B | HR-GB: MONTHLY(NR) | 26.06.2021 | STANDARD CONTRACT | REST OF U.K. | GRD04 | 1 | MWSS | BOPY | BONUS | 9100 | PERIODIC BONUS | 2.500,00 | 0,00 | 0,00 | GBP |
| 20211045 | MISS DORIS SMALL | NR6:5556B | HR-GB: MONTHLY(NR) | 26.06.2021 | STANDARD CONTRACT | REST OF U.K. | GRD04 | 1 | MWSS | HOPY | HOLIDAY PAY | 9200 | HOLIDAYS | 500,00 | 0,00 | 0,00 | GBP |
| 20211045 | MISS DORIS SMALL | NR6:5556B | HR-GB: MONTHLY(NR) | 26.06.2021 | STANDARD CONTRACT | REST OF U.K. | GRD04 | 1 | MWSS | GRPY | GROSS PAY | M010 | MONTHLY SALARY (IND.EVAL) | 2.585,00 | 0,00 | 0,00 | GBP |
| 20211055 | MR SIMON SMALL | NR6:4567B | HR-GB: MONTHLY(NR) | 26.06.2021 | STANDARD CONTRACT | REST OF U.K. | GRD02 | 1 | MWSS | GRPY | GROSS PAY | M010 | MONTHLY SALARY (IND.EVAL) | 1.765,00 | 0,00 | 0,00 | GBP |
| 20211055 | MR SIMON SMALL | NR6:4567B | HR-GB: MONTHLY(NR) | 26.06.2021 | STANDARD CONTRACT | REST OF U.K. | GRD02 | 1 | MWSS | OVPY | OVERTIME | M012 | O/TIME X 1.25 | 52,20 | 4,00 | 0,00 | GBP |
| 20211055 | MR SIMON SMALL | NR6:4567B | HR-GB: MONTHLY(NR) | 26.06.2021 | STANDARD CONTRACT | REST OF U.K. | GRD02 | 1 | MWSS | OVPY | OVERTIME | M014 | O/TIME X 1.50 | 62,64 | 4,00 | 0,00 | GBP |
| 20211055 | MR SIMON SMALL | NR6:4567B | HR-GB: MONTHLY(NR) | 26.06.2021 | STANDARD CONTRACT | REST OF U.K. | GRD02 | 1 | MWSS | OVPY | OVERTIME | M016 | O/TIME X 2.00 | 208,80 | 10,00 | 0,00 | GBP |

Log

- MWSS LEVEL
- MWSS SUMMARY
- MWSS TOTALS
- STATISTICS
- ⊙ PERSON-SPECIFIC MESSAGE

406

MWSS Summary

| PERS.NO. | P AREA | AREA TEXT | SUBAPP. | CUMUL. | CUMWTTXT | AMOUNT | NUMBER | RATE | FURLOUGH... | FOR PERI... |
|---|---|---|---|---|---|---|---|---|---|---|
| 20208001 | GN | HR-GB: MONTHLY (NR) | MWSS | BOPY | BONUS | 5.000,00 | 0,00 | 0,00 | | 202103 |
| 20211040 | GN | HR-GB: MONTHLY (NR) | MWSS | GRPY | GROSS PAY | 2.750,00 | 0,00 | 0,00 | | 202103 |
| 20211045 | GN | HR-GB: MONTHLY (NR) | MWSS | BOPY | BONUS | 2.500,00 | 0,00 | 0,00 | | 202103 |
| 20211045 | GN | HR-GB: MONTHLY (NR) | MWSS | GRPY | GROSS PAY | 2.585,00 | 0,00 | 0,00 | | 202103 |
| 20211055 | GN | HR-GB: MONTHLY (NR) | MWSS | GRPY | GROSS PAY | 1.765,00 | 0,00 | 0,00 | | 202103 |
| 20211055 | GN | HR-GB: MONTHLY (NR) | MWSS | OVPY | OVERTIME | 323,64 | 0,00 | 0,00 | | 202103 |

FIG. 4B

MWSS Totals

| PAr... | No. of EEs | Fur. EEs | Subapp. | Cumul... | CumWTxt | Amount | Number | Rate | For Peri... |
|---|---|---|---|---|---|---|---|---|---|
| GN | 7 | 0 | MWSS | BOPY | Bonus | 7.500,00 | 0,00 | 0,00 | 202103 |
| GN | 7 | 0 | MWSS | GRPY | Gross Pay | 7.100,00 | 0,00 | 0,00 | 202103 |
| GN | 7 | 0 | MWSS | OVPY | Overtime | 323,64 | 0,00 | 0,00 | 202103 |

FIG. 4C

MWSS Summary

| PERS.NO | FOR.PERI. | PAREA | PAREA TEXT | PAYROLL | SUBAPP | CUMUL... | CUMWTTXT | MAXIMUM AMOUNT | NUMBER | RATE | CRCY COMP.PER.NO. | BETPE | COMP.PER.AM... | ABS.DIFF.N... | PERC.ABS... | ABS.DIFF.AMNT | PERC.DIFF.NO | PERC.REL.D | PERC.DIFF.AMNT |
|---|---|---|---|---|---|---|---|---|---|---|---|---|---|---|---|---|---|---|---|
| 20191061 | 201810 | G1 | HR-GB | MONTHLY | MWSS | GRPY | GROSS PAY | 7.281,60 | 0,00 | 7.281,60 | | 0,00 | 0,00 | 6.647,79 | 0,00 | 0,00 | 633,81 | 0,00 | 0,00 | 19,08 |
| 20191061 | 201810 | G1 | HR-GB | MONTHLY | MWSS | OVPY | OVERTIME | 7.662,72 | 0,00 | 7.662,72 | | 0,00 | 0,00 | 7.000,00 | 0,00 | 0,00 | 662,72 | 0,00 | 0,00 | 18,94 |
| 20191061 | 201810 | G1 | HR-GB | MONTHLY | MWSS | HOPY | HOLIDAY PAY | 807,37 | 0,00 | 807,37 | | 0,00 | 0,00 | 721,88 | 0,00 | 0,00 | 85,49 | 0,00 | 0,00 | 26,68 |

FIG. 5B

MWSS Totals

| PAR... | FOR.PERI. | SUBAPP | CUMUL... | CUMWTTXT | AMOUNT | NUMBER | RATE | CRCY COMP.PER.NO. | BETPE | COMP.PER.AM... | ABS.DIFF.N... | PERC.ABS... | ABS.DIFF.AMNT | PERC.DIFF.NO | PERC.REL.D | PERC.DIFF.AMNT |
|---|---|---|---|---|---|---|---|---|---|---|---|---|---|---|---|---|
| G1 | 201810 | MWSS | GRPY | GROSS PAY | 7.281,60 | 0,00 | 7.281,60 | 0,00 | 0,00 | 6.647,79 | 0,00 | 0,00 | 633,81 | 0,00 | 0,00 | 19,08 |
| G1 | 201810 | MWSS | OVPY | OVERTIME | 7.662,72 | 0,00 | 7.662,72 | 0,00 | 0,00 | 7.000,00 | 0,00 | 0,00 | 662,72 | 0,00 | 0,00 | 18,94 |
| G1 | 201810 | MWSS | HOPY | HOLIDAY PAY | 807,37 | 0,00 | 807,37 | 0,00 | 0,00 | 721,88 | 0,00 | 0,00 | 85,49 | 0,00 | 0,00 | 26,68 |

FIG. 5C

SINGLE-ACTION ELECTRONIC REPORTING

RELATED APPLICATIONS

This non-provisional patent application claims prior benefit, with regard to all common subject matter, of earlier-filed Indian Provisional Patent Application No. 202111039057, filed Aug. 28, 2021. The identified provisional patent application is hereby incorporated by reference in its entirety into the present application

BACKGROUND

1. Field

Embodiments of the present teachings relate to systems and processes for providing electronic reporting documents. Specifically, embodiments of the present teachings relate to generating electronic reporting documents in a single action.

2. Related Art

In electronic reporting, government regulations may be frequently updated. Each time new government regulations are updated, electronic reporting software must be updated to reflect the regulatory updates. Typically, old reports are updated with the new regulations; however, if the new reporting regulations are extensive, the old reports may be discarded and new reports may be generated. A provider of reporting services supporting the electronic reporting for a plurality of companies must then generate new documents for new regulations for each jurisdiction. Furthermore, customers, or clients, may have a unique set of criteria that the customer wants included in the generated documents. As such, new documents for each customer may be required. There are currently no single reports that may be updated to cover all customers within a single regulatory change and no single report that may cover all regulatory changes across a plurality of jurisdictions. Therefore, thousands of new documents may be required each year to keep up with the changing regulations and customer requirements. The current system is not efficient as time and costs increase to keep up with these ever-changing demands. Furthermore, administrators typically must generate a plurality of electronic documents derived from a plurality of databases and processes to generate the necessary documents for electronic reporting per reporting period, per quarter, per year, and the like. This is extremely time consuming and inefficient.

What is needed is a single utility electronic report that includes all data that can be custom organized such that any electronic report can be generated across different reporting categories in a single action.

SUMMARY

Embodiments of the disclosure solve the above-described problems by providing programs, systems, and methods for an electronic reporting system that receives parameter inputs, accesses payroll data, and generates payroll reports for employees, employers, insurance reporting, and government reporting, across a plurality of jurisdictions. A first embodiment is directed to a method of providing electronic reports by a single-action electronic report determining system. The method comprises: receiving a new report requirement; receiving, by a first user interface, selection of a sub-application based at least in part on the new report requirement; generating, by a second user interface, one or more selections of report data types associated with cumulation data types to be included in the sub-application; generating the sub-application based at least in part on a configuration file, the cumulation data types, and the report data types; and presenting at least one report of a first level of granularity, at least one summary report of a second level of granularity, and at least one totals report.

A second embodiment is directed to one or more non-transitory computer-readable media storing computer-executable instruction that, when executed by a processor, perform a method of providing electronic reports by a single-action electronic report determining system. The method comprises: receiving a new report requirement; receiving, by a first user interface, selection of a sub-application based at least in part on the new report requirement; auto-populating, on a second user interface, one or more cumulation data types to be included in the sub-application; generating, one or more selections of report data types associated with cumulation data types to be included in the sub-application; generating the sub-application based at least in part on a configuration file, the cumulation data types and the report data types; and presenting at least one report of a first level of granularity, at least one summary report of a second level of granularity, and at least one totals report.

A third embodiment is directed to a single-action electronic report determining system for providing electronic reports. The system comprises a data store, a processor, and one or more non-transitory computer-readable media storing computer-executable instructions that, when executed by the processor, perform a method of providing the electronic reports. The method comprises: receiving a new report requirement from a regulatory body or a client; receiving, by a first user interface, selection of a sub-application based on the new report requirement; auto-populating, by a second user interface, one or more cumulation data types to be included in the sub-application; generating one or more selections of report data types associated with cumulation data types to be included in the sub-application; replacing at least one auto-populated cumulation data type with a selected cumulation data type; generating the sub-application based at least in part on a configuration file, the cumulation data types, and the report data types; and presenting at least one report of a first level of granularity, at least one summary report of a second level of granularity, and at least one totals report.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments of the disclosure are described in detail below with reference to the attached drawing figures, wherein:

FIG. 2 depicts an exemplary interface for receiving parameters for generating electronic reports;

FIG. 3B depicts an exemplary sub-application structure;

FIG. 3C depicts an exemplary interface for receiving selection of cumulation data types for the sub-application selected in FIG. 3A;

FIG. 3D depicts an exemplary interface for receiving selection of wage types for the cumulation data types of FIG. 3C;

FIG. 4A depicts an exemplary summary output report;

FIG. 4B depicts an exemplary output report;

FIG. 4C depicts an exemplary totals output report;

FIGS. 5A-5C depict exemplary outputs for data comparison;

Figure 1:
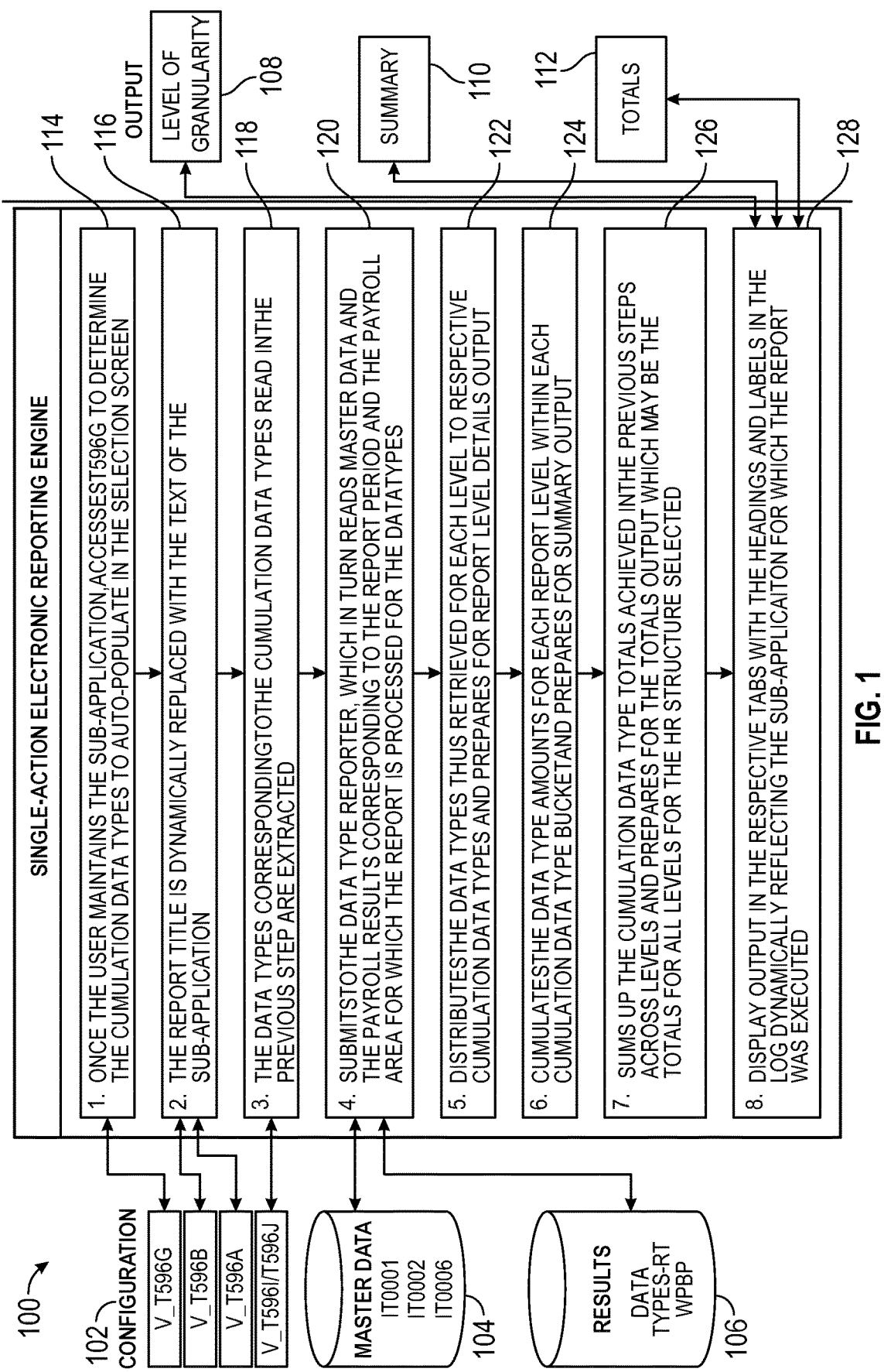
FIG. 1 depicts an exemplary process of generating electronic reports by a single-action reporting engine.

The drawing figures do not limit the present teachings to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the present teachings in sufficient detail to enable those skilled in the art to practice the present teachings. Other embodiments can be utilized, and changes can be made without departing from the scope of the present teachings. The following detailed description is, therefore, not to be taken in a limiting sense. The scope of the present teachings is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, electronic reporting systems may receive input related to changes to a report output. In some embodiments, electronic reporting systems described herein may expose report data such that electronic reports may be generated with any arrangement of the report data. The electronic reporting system may analyze any data and generate reports according to regulatory requirements. Exemplary methods of payroll reporting are described herein; however, any electronic reporting may be imagined. For example, inventory reports, financial reports, personnel reports, and any other electronic reports may be generated. The electronic reports may comprise various categories and levels of granularity for each category.

In some embodiments, the electronic reporting documents may be generated based on a configuration file. The configuration file may be editable by the user such that the user may select data types and cumulation data types to be applied to the configuration file for a particular sub-application format. In an exemplary embodiment, personnel data associated with employees of a company may be stored such that the personnel data may be accessed and obtained by the electronic reporting system. The user may define data types, cumulation data types, and the sub-application for presentation of the data. The configuration file may be stored, and the sub-application may be output presenting the data as defined by the user in the format based on the user defined parameters.

In some embodiments, the personnel data may be any information associated with personnel of a company that may be recorded and stored in a data table, document, or other format for visualization. The personnel data, or information-type data, may include any information associated with an employee such as name, identification number, employment contract, schedule, home address, and any other data that may be associated with the personnel. In some embodiments, the personnel data further comprises data types such as, for example, hourly or salary pay, bonus pay, overtime pay, per-diem, tax withholdings, insurance withholdings, retirement withholdings, and any other smallest granular level of pay data. In some embodiments, the personnel data may be stored as, or generally referred to as master data, and stored in a master data database.

In some embodiments, an electronic driver comprising at least one processor and accessing computer-readable media storing computer-executable instructions, accesses the master data and determines outputs such as, for example, net pay of the employee, total net pay of all employees, total pay for a department or a group of employees, and any other data associated with personnel. Furthermore, the electronic driver may determine result data for output associated with statutory regulations such as, for example, total tax withholdings, total insurance withholdings, and the like. The output data may be provided in tables that represent various levels of granularity as shown in FIGS. 4A-4C. In some embodiments a time period may be applied to the calculations such as, for example, one pay period, one month, one year. In some embodiments, the output of the electronic driver may be stored in clusters. When the data is stored as clusters, the data may be finished being processed. The data may only be stored and moved between data tables.

In some embodiments, the data stored in the clusters may be referred to herein as data types. The data types may be a smallest granular stored data representing an amount such as, for example, a single element of a salary, a bonus, and the like.

In some embodiments, the cumulation data types may be data types that is cumulated for presentation. For example, cumulation data types may be a salary, a bonus, and the like as described above, but cumulated into buckets for output and presentation. Furthermore, cumulation data types may also be a total salary paid out to all personnel, all bonuses for an employee for a time period, all overtime pay for a set group of employees, or the like.

FIG. 1 depicts an exemplary process for generating electronic reports by a report generation engine generally referenced by the numeral 100. The report generation engine may be accessed by any user with access to an electronic reporting system (e.g., company payroll system). The report generation engine may integrate with any company systems and may be accessible by any user with access to the company systems. In some embodiments, the report generation engine accesses configuration files 102, master data 104, and personnel data 106 to generate the electronic reports comprising level reports 108, summary reports 110, and totals reports 112. In FIGS. 2-3A and 3C-4C, interfaces of the electronic reporting system are depicted for receiving user input designating parameters for determining the electronic reporting system outputs depicted in FIGS. 4A-5B.

At step 114, the report generation engine may receive selection, by a user (e.g., a payroll administrator), of a configuration file from configuration files 102. The report generation engine may read the configuration file and determine the cumulation data types to auto-populate from the configuration file to the selection screen.

At step 116, a title of the report and any other text associated with the configuration file may be dynamically replaced with text of the sub-application associated with the obtained configuration file. The text of the sub-application may be defined by the configuration file.

At step 118, data types corresponding to cumulation data types may be extracted for submission to the data type reporter. At step 120, the data types may be submitted to the data type reporter and the master data 104 and the personnel data 106 corresponding to the pay period and the selected area for which the report is processed for the data types. Time period selection and data type details may be provided to the data type reporter.

At step 122, the retrieved data types may be distributed across corresponding cumulation data types as indicated by the association between cumulation data types and data types according to the configuration file.

At steps 124-128 the collected and distributed data may be collected and organized according to sub-application output reports and presented. At step 124, the data type amounts may be cumulated within each cumulation data type bucket and prepared for output to summary reports 110. At step 126, the cumulation data types may be summed to determine cumulation data type totals across all personnel for total report. At step 128, the output may be displayed in separate tabs including levels report 108, summary reports 110, and totals report 112. Exemplary employee report, summary report, and totals report are illustrated in FIGS. 4A-4C.

FIG. 2 depicts an exemplary user interface displaying parameter input boxes generally referenced by the numeral 200. Parameter input boxes may be presented to the user by the electronic reporting system for input of parameters for generating output reports as illustrated in FIGS. 4A-4C. The input parameters may define which configuration files are used such that a configuration file may present data to the report generation engine for determining and outputting the output reports.

In some embodiments, the user may define a period 202 for reporting data across a particular period such as, for example, a payroll period. Area field 204 may receive a designation of an area which, in some embodiments, may be, for example, a department, a plant, a country, and the like. In some embodiments, employees with different pay frequencies or pay patterns may be designated such as, for example, weekly pay, monthly pay, and the like. In some embodiments a time frame to obtain a set of data for analysis is defined. Current period field 206 and another period field 208 may be selected. Selection of current period field 206 may provide a current period for analysis by report generation engine. In some embodiments, when other period field 208 is selected, a time period may be manually input into a time field. Any time frame may be applied for analyzing the data associated with the area designation. In some embodiments, when an area and a time frame are selected all data associated with the area during the time frame may be available to the user. The user may further select data types and data cumulation types to be presented, and how the data is presented, by creating variants, or functions, to present the data in any way desired.

Selection box 210 may provide a personnel number field 212 for receiving a personnel number from the user. The personnel number may be associated with an individual, department, group, or any range of personnel numbers. The personnel number may provide a bound on the set of data to be obtained and analyzed. Furthermore, in some embodiments, area field 214 may be provided. When the area is selected under period 202, the defined area may be automatically displayed in area field 214. As such, the user may confirm that the area selected in area field 204 is the same as the area defined in area field 214. Similarly, the user may verify that the personnel number is associated with the area field 214. In some embodiments, the electronic reporting system may automatically compare the personnel number with the area to determine that the personnel number corresponds with the area. If the personnel number is associated with a different area, if the pay frequency is different for a plurality of selected areas, or any other inconsistencies are present in the data analysis, an error notification may be displayed by the user interface.

Figure 5A:
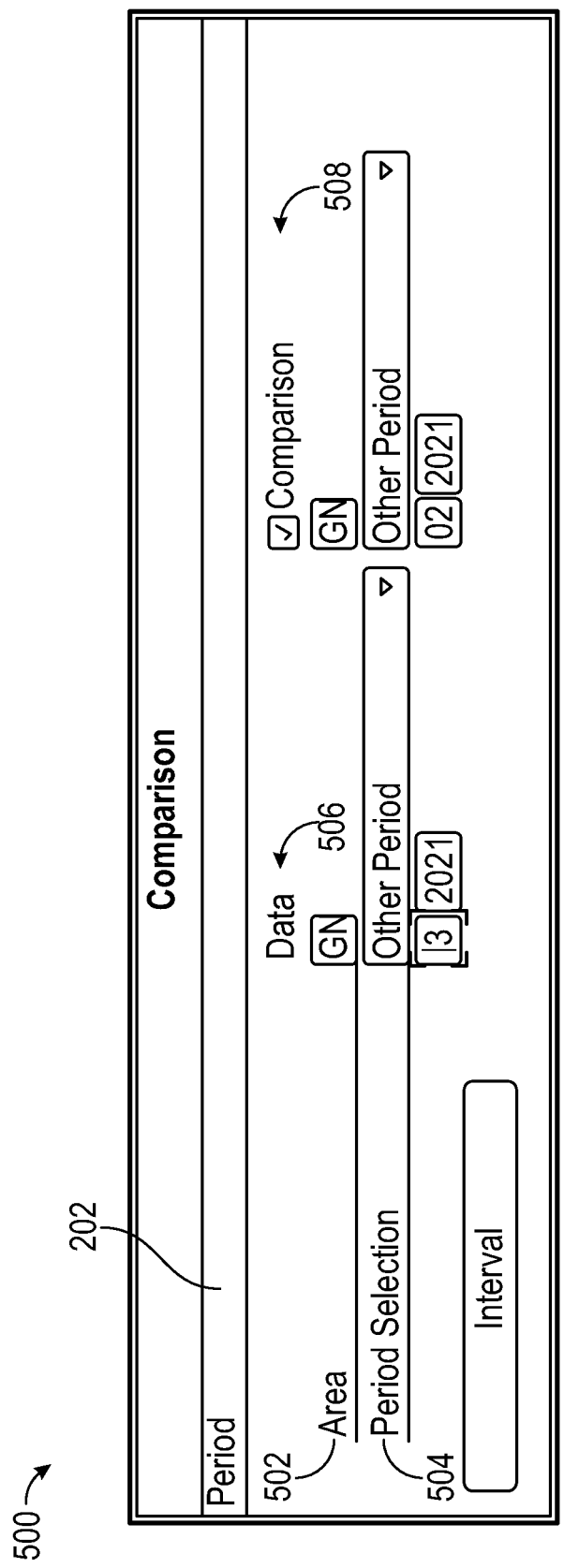

In some embodiments, interval period 216 is depicted providing a start date and an end date. The user may edit the dates to provide a custom time range for electronic reporting. In some embodiments, the user may select period button 218. As depicted in FIG. 5A, when the user selects period button 218, a comparison interface may be displayed, and the user may input a plurality of time ranges for data comparison. Data comparison based on time ranges is described in more detail below in reference to FIGS. 5A-5C.

In some embodiments, period determination box 220 is presented and in-view periods 222 may be selected by default. In cases where accounting results are retroactive in-periods and for-periods may be different. The user may select either in-view periods 222 or for-view periods 224 depending on the type. The in-period for results is associated with the period in which the associated for-period is generated.

In some embodiments, other selections box 226 is presented. Other selections box 226 may comprise inputs for sub-application selection 228, cumulation data type selection 230, and selections for archived results selection 232 and recs with null values selection 234. At other selections box 226, the user may select the sub-application from a plurality of stored sub-applications from a database of sub-applications. The sub-application selection may reference a corresponding configuration file that provides a unique set of functions. Because the selection is based on a sub-application, the electronic reporting system can process any existing or new configuration files. As such, the user may generate new custom sub-applications without writing any code.

When the sub-application is populated, cumulation data types may be obtained by reading the configuration files corresponding to the sub-application and auto populated on a cumulation data type interface. Cumulation data types may be editable such that the user may define which cumulation data types are presented in the sub-application. In some embodiments, the user may also choose to include archived results be selecting archived results selection 232 and display recs with null values selection 234.

The user may also select outputs to be displayed at output box 236. The user may choose to analyze and provide customized outputs by selecting level data field 238, summary field 240, and totals field 242. Furthermore, comparison outputs may be selected at the output box by selecting comparison data 244, comparison summary 246, and comparison totals 248. The outputs are discussed in more detail below in reference to FIGS. 4A-4C and 5B-5C. By incorporating the sub-application and the cumulation data types into the selection criteria, the report generation engine eliminates the need to build a new report each time there is a new requirement and provides a solution to which cannot be achieved by executing a single report. In some embodiments, the requirement by the regulatory bodies or the customers may become a new sub-application. The various monetary components that need be reported may become the cumulation data types. The different data types against which these monetary fields are stored in the results may then be grouped under the cumulation data types in, for example, documents such as V_T5961_IE and V_T5961_IE or V_T596J_GB and V_T596J_IE (e.g., for Human Capital Management Great Britain and Ireland Payroll Localizations).

For example, UK legislation mandates that all businesses employing over 1,000 employees to take up a monthly survey which furnishes the details of the following payments as totals for the different pay frequencies.

a. Gross Pay
b. Holiday Pay
c. Pay Awards
d. Furlough Payments with top up
e. Bonuses
f. Overtime Instead of building a new report, the electronic reporting system generates the reports as described in embodiments herein.

Figure 3A:
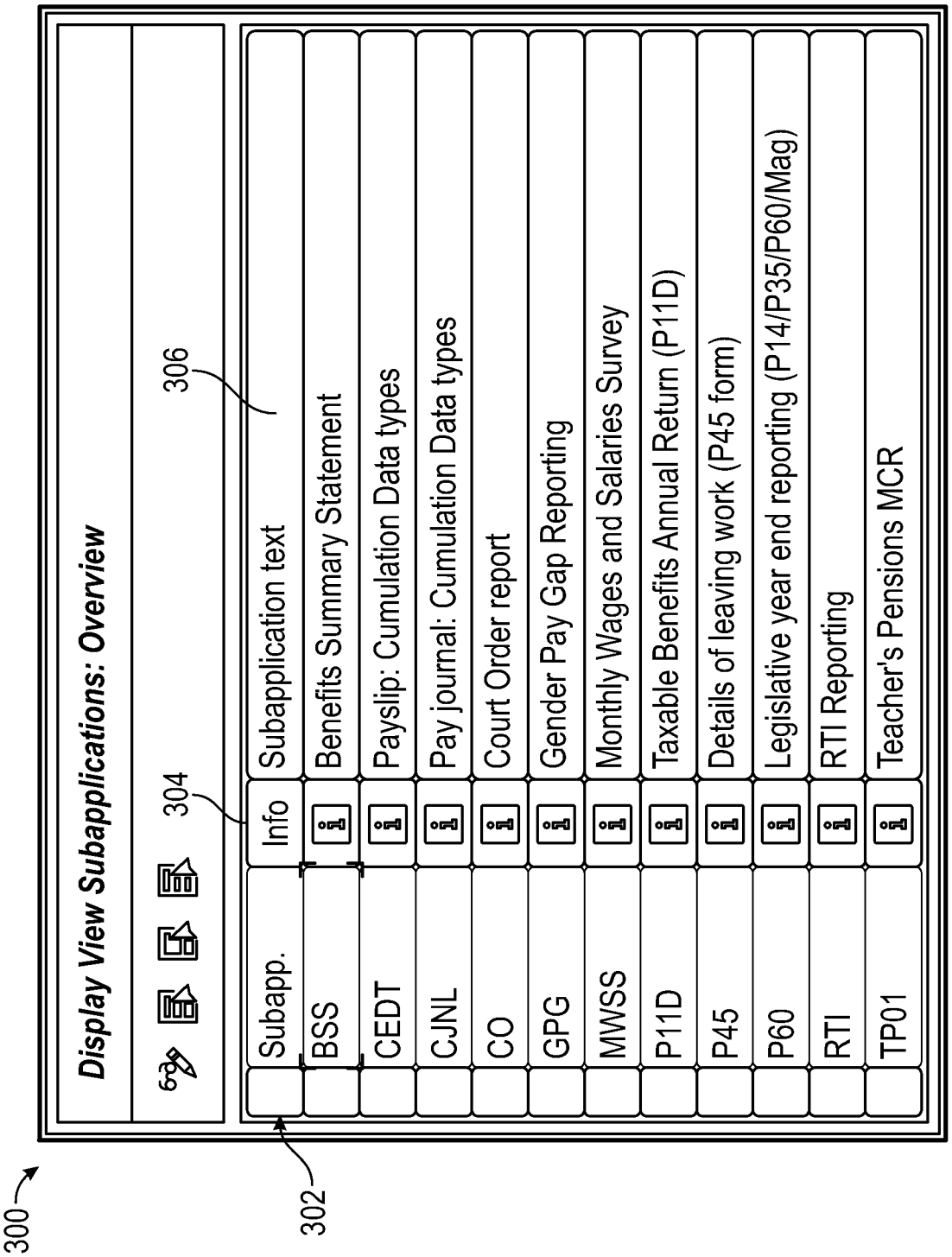
FIG. 3A depicts an exemplary interface for receiving sub-application designations for generating electronic reports.

FIG. 3A depicts an exemplary display of sub-applications overview page 300. In some embodiments, sub-applications may be viewed and selected for analysis from sub-applications overview page 300. Sub-applications overview page 300 may provide sub-applications identifier menu 302, sub-application information button 304, and sub-application text 306 which may be a brief description or title of the corresponding sub-application. In some embodiments, the user may select sub-applications identifier menu 302 to designate the sub-application for analysis and presentation. Furthermore, sub-application information button 304 and/or sub-application text 306 may be selected and a description of the sub-application as well as an example layout of the corresponding sub-application may be displayed.

FIG. 3B depicts an exemplary sub-application structure 308. In some embodiments, sub-application structure A 310 comprises cumulation data types 1, 2, and 3, and corresponding data types 1-9 in various arrangements across the cumulation data types. Similarly, sub-application structure B 312 may comprise data types 1, 4, and 5, corresponding to combinations of data types 1-14. For example, sub-application A may comprise cumulation data type 1 which may be, for example, bonus pay. Bonus pay may further be broken down by data type such as, for example, annual bonus, profit share, holiday bonus, and incentives. As such, sub-applications may comprise a specific arrangement of elements (e.g., payroll elements). The sub-applications structure may be based on tax and insurance statutory regulations or on customer requirements. As described herein, the user may add and remove any sub-applications, cumulation data types, and data types, for providing any desired output.

Because all the data is accessed and associated with selected sub-applications, any data types, cumulation data types, may be provided in any sub-applications. This provides a single report that may include any data in any arrangement for electronic reporting. As described above, any data types may be logically stored or grouped into buckets for cumulation data types.

FIG. 3C depicts an exemplary cumulation data types page 314 which, in some embodiments, presents the standard or automatically selected cumulation data types. Cumulation data types page 314 may comprise cumulation data types table 316. Cumulation data types table 316 may comprise cumulation data type identifiers, information, and text fields as in reference to sub-applications overview page 300 above. In some embodiments, the user may select the cumulation data types to be include in the selected sub-application by cumulation data types page 314. For example, Monthly Wages and Salaries Survey (MWSS) may be an exemplary statutory reporting document. Six monetary fields may be required by MWSS. For example, pay awards, bonuses, furlough, gross pay, holiday pay, and overtime pay, may be required. As such, six cumulation data types and the associated identifiers are shown in FIG. 3C.

FIG. 3D depicts an exemplary data type page 318 presenting the data types 322 in which the corresponding monetary amounts are stored in the cumulation data types 320. Data type page 318 may also include time frame 324, arithmetic calculation 326, and amount, number, or rate 328. In some embodiments, time frame 324 may be the time frame defined by the user in reference to FIG. 2 described above. Time frame 324 may also be an exemplary standard time frame automatically determined based on the pay schedule of the company for which the reports are generated. The arithmetic calculation 326 may present the calculation to arrive at the numeric amount presented by the cumulation data types 320 and the amount, number, or rate 328 may present a brief description of dimensions of the calculated numeric amount.

Figure 3E:
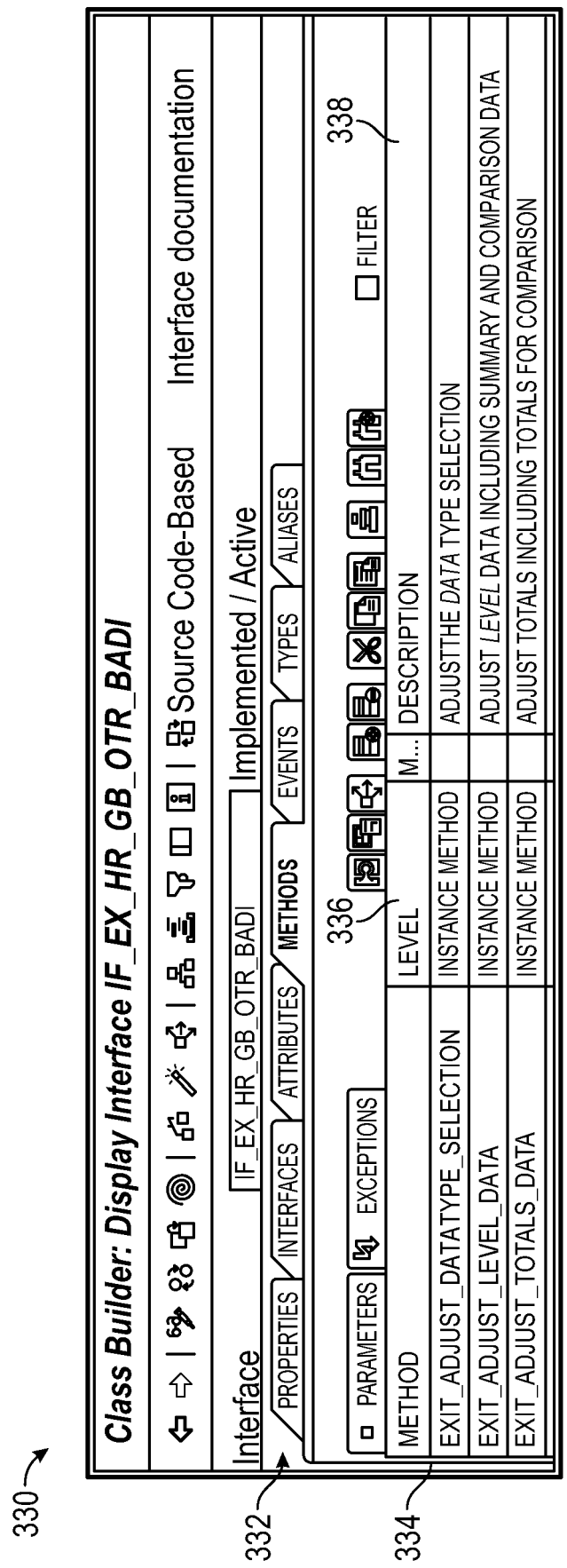
FIG. 3E depicts an exemplary custom builder interface.

FIG. 3E depicts an exemplary class builder interface 330 for customizing the sub-application analysis and output. The interface allows users to overwrite selections of the sub-application. The user may select and customize any of the options presented in options menu 332 such as, for example, properties, interfaces, attributes, methods, events, types, and aliases. The user may select any of the options and provide code to customize the outputs. For example, the menu option methods is selected in FIG. 3E. The user may select and edit each category method 334, level 336, and description 338 such that what is edited is stored. The user may overwrite the data type selection for which the report was executed. The user may add additional data types and omit data types thus customizing the sub-application. The user may customize the reports for any of the output table described herein including personnel data, summary data, and comparison data, totals data, and totals comparison data as described below and displayed in FIGS. 4A-4C and FIGS. 5B-5C.

FIGS. 4A-4C depict outputs for non-comparison data generated by the programs, processes, and system described above. The output tables depicted may provide data at various levels of granularity. For example, FIG. 4A may depict a first level of granularity, FIG. 4B may depict a second level of granularity, and FIG. 4C may depict totals as described below. The output table may be output and presented in any format to the user and personnel. The data thus generated may be sent directly to customers and/or regulatory bodies. FIG. 4A depicts an exemplary output table 400 for level 1 which may correspond with any level of granularity (e.g., employee level). Output table 400 may provide a fine level of detail for electronic reports. The data types and value amounts of each data type may be provided along with the corresponding cumulation data types for the sub-application for which the report is processed. Output table 400 may provide data associated with each employee such that customers may easily perform payroll reconciliation. Furthermore, payroll administrators may access output table 400 when questions arise regarding pay.

Displayed fields may be modified and/or arranged in various ways. Display variants may be described prior to output of the tables such that any fields can be controlled. Furthermore, in some embodiments, the fields, columns, rows, and the like may be arranged directly in the displayed tables. Presented below is a non-exhaustive list of populated fields for output table 400. Any of the data listed in Table 1 below may be included in any output described herein associated with each output header 402.

TABLE 1

1. Personnel Number
2. NI Number
3. Payroll area
4. Payroll area text
5. Payment date
6. Pay scale type text
7. Pay scale area text
8. Pay Scale Group
9. Pay scale level
10. Sub-application
11. Cumulation data type
12. Cumulation DT text
13. Data Type
14. Data Type Long Text
15. Data Type Amount
16. Number/unit
17. Rate
18. Currency
19. Furloughed Employee
20. For Period
21. Last name First name
22. Company Code
23. Company Name
24. Personnel area
25. Personnel Area Text
26. Personnel area
27. Personnel subarea
28. Pers. subarea text
29. Controlling Area
30. Employee group
31. Name of employee grp
32. Period Parameters
33. In-period f. payroll
34. Payroll area
35. Payroll area text
36. HCM Localization
37. Organizational unit
38. Organizational key
39. Legal person
40. Administrator group
41. Personnel administrator
42. Payroll administrator
43. Daily working hours
44. Weekly workdays
45. Work hours/period
46. Capacity Util. Level
47. Time Management status
48. Work schedule rule
49. Employment percent
50. Pay scale type
51. Pay Scale Area FIG. 4B depicts an exemplary summary table 404. Summary table 404 provides another level of detail of the accessible data. In some embodiments, summary table provides summed amounts for data types corresponding to cumulation data types. For example, the corresponding totals for bonuses, gross pay, overtime, and the like may be summed for each personnel number.

Furthermore, summary table 404 presents table menu 406. Table menu 406 may present each of the data tables, output table 400, summary table 404, and totals table 408 for selection by the user. When the user selects a table, the selected table may be displayed. Statistics may be selected and statistics corresponding to each table as well as calculated statistics across the tables may be displayed. Statistics may be calculated for each sub-application including statistics related to the analysis. For example, in some embodiments, a statistics table (not shown) may display a number of personnel processed, a number of successful personnel processed, a number of personnel excluded from processing, and a number of personnel rejected from processing. Personnel may be excluded and rejected for a number of reasons. For example, personnel may be rejected or excluded for not being active with the company. Person-specific messages may be selected to display personnel that are no longer active. When the analysis is performed for a group of personnel, some personnel in the data set may not currently be employed or may be inactive such as, for example, on sabbatical or leave. In this case, the personnel no longer active may be removed from analysis and listed under the person-specific messages tab. Table menu 406 may be accessible by each table.

FIG. 4C depicts an exemplary totals table 408. In some embodiments, totals table 408 may provide the total bonus, gross pay, overtime pay, and any other pay that may be provided to personnel. In some embodiments, company code, cost center, and/or area (e.g., pay frequency) may also be provided. In some embodiments, totals table 408 may provide any necessary data for statutory electronic reporting to government agencies as well as customer requirements.

In addition, the above-described reports may also provide exits at a plurality of locations as depicted in FIG. 3E. A first user exit may be provided at start of selection giving the customers the flexibility to amend the data types selected for processing. A second user exit may be provided giving the customers the flexibility to overwrite the derived values or write their own logic to incorporate any other formula or logic on certain fields. For example: a percentage calculation may be performed on one of the monetary fields derived by the report, then users can implement their own custom code to achieve this. A third user exit may be provided at the end of selection giving the customers the flexibility to overwrite the totals values derived by the report.

In some embodiments, data for a given time frame may be compared to data from a different time frame. FIG. 5A depicts comparison selection menu 500. FIG. 5A presents period 202 as described above and including area selection 502, period selection 504, data selection 506, and comparison selection 508. Period 202 may receive input to provide a detailed input and comparison of data across time periods. The user may provide a first payroll input at data selection 506 and a second data input at comparison selection 508 to compare data (e.g., payroll) at various time periods. The comparison may aid companies in evaluating efficiency and profits between various time periods such as, for example, from pay period to pay period or from quarter to quarter. In some embodiments, the data may be processed without the comparison. The comparison may be defined only when, for example, various payrolls may be compared based on defined parameters. The comparison may be calculated to determine differences between a plurality of data sets. For example, the differences between the same sets of personnel but for different time periods may be calculated. In some embodiments, the payroll for a single employee may be compared for various periods. An error may be reported when a plurality of areas is selected when the exemplary payroll comparison is set.

FIGS. 5B-5C depict an exemplary output of a comparison between pay periods for a set of employees at a specified area. FIG. 5B depicts comparison summary page 510 and FIG. 5C depicts comparison totals page 512. As such, the output shows the difference between the data type amount, rate, and the number fields. This process provides differences between payroll for different pay periods for the same payroll areas. Any differences between data amounts may be calculated and presented across any tables. In some embodiments, the comparison output tables may be structure similarly to the tables displayed in FIGS. 4A-4C. For example, table menu 406 may be used to select between the various tables. Furthermore, any of the above-described list of items may be presented in fields in the tables. The columns of any table may be arranged in any order and may be customizable by the user. Furthermore, the rows of any table may be arranged in any order such as, for example, chronological, maximum-to-minimum, minimum-to-maximum, or any other arrangement.

Figure 6:
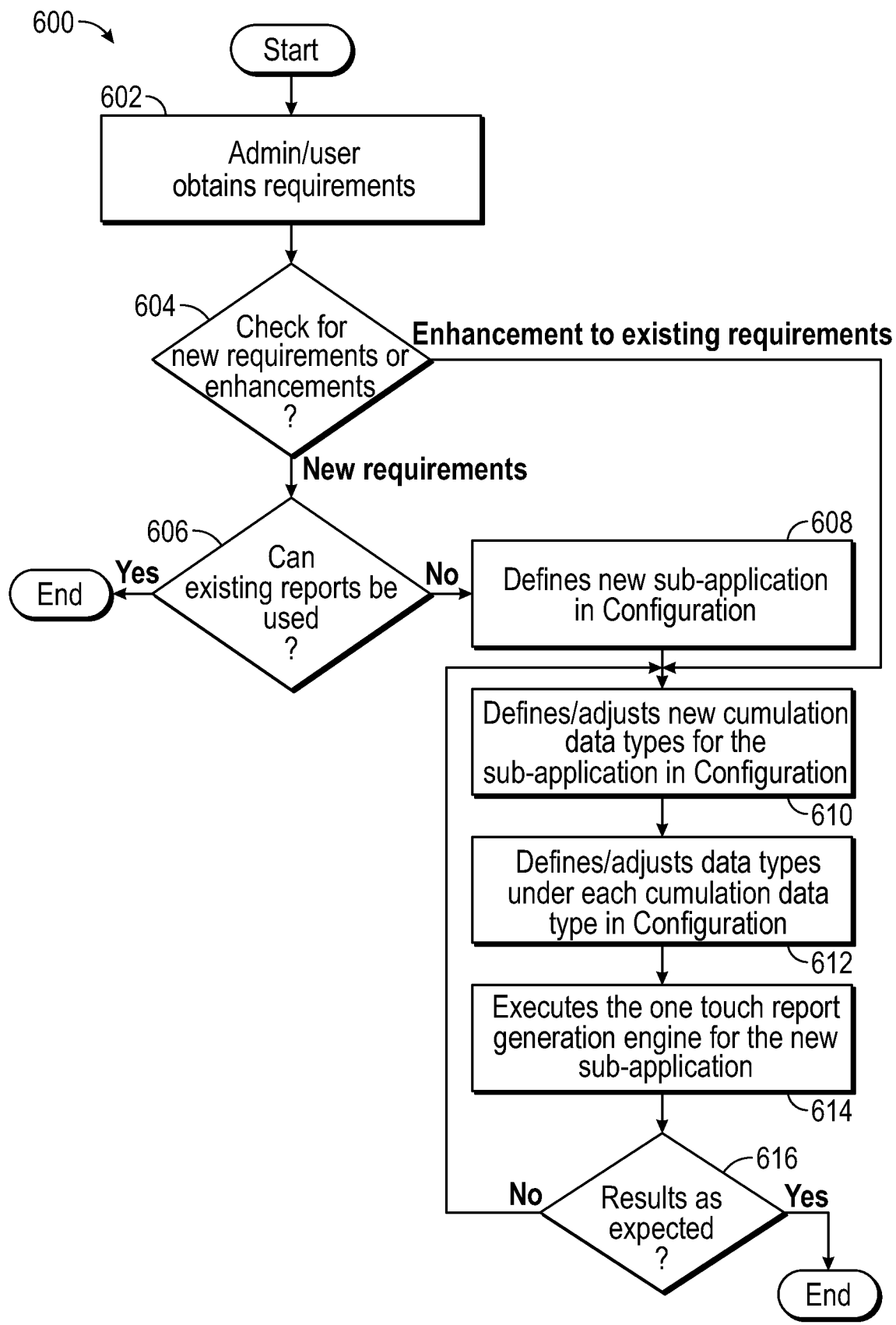
FIG. 6 depicts an exemplary process of receiving parameters and generating electronic reports.

FIG. 6 depicts an exemplary process for generating electronic reporting documents based on requirements generally referenced by the numeral 600. At step 602, the administrator in charge of updating the electronic reporting system may receive new requirements from a regulatory agency or from a customer. The new requirements may require updates to the existing reports and/or may require new reports to be generated.

At step 604, the administrator may check the requirements to determine if new requirements or enhancements are present. If no new requirements are present, the process may proceed to step 610. If new requirements are present, the process may continue at step 606.

At step 606, the administrator may check existing reports to verify that the existing reports meet the new requirements. If the existing reports meet the new requirements, the process is finished. If the existing reports do not meet the new requirements, the process may move to step 608.

As depicted in FIG. 2 and FIGS. 3A-3D and described above, the user (e.g., administrator) may define a new sub-application, new cumulation data types, and new data types in step 608, step 610, and step 612. The system may present the corresponding user interfaces for receipt of the parameters as described in embodiments above. When the sub-application and new data types corresponding to the sub-application have been selected, the single-action report generation engine may be executed at step 614.

At step 616, the electronic reporting system may output the results. The user may check the results against the new requirements to verify that the results meet all requirements. If the results meet the requirements the process is finished. If the results do not meet the requirements, the process may return to step 610.

Figure 7:
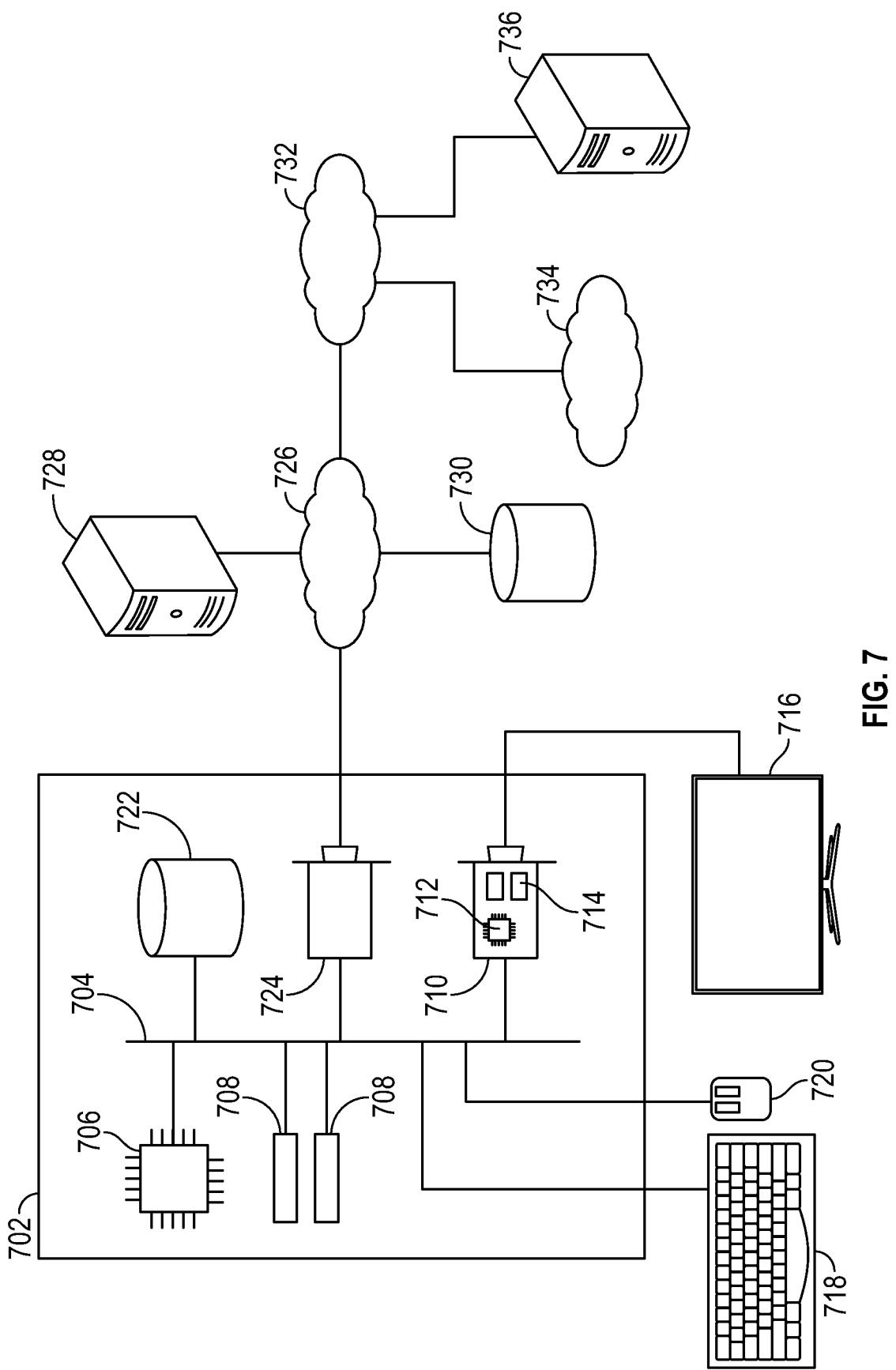
FIG. 7 depicts an exemplary embodiment of a hardware platform for use with embodiments of the present disclosure.

Turning to FIG. 7, an exemplary hardware platform that can form one element of certain embodiments of the disclosure is depicted. Computer 702 can be a desktop computer, a laptop computer, a server computer, or any other form factor of general- or special-purpose computing device. Depicted with computer 702 are several components, for illustrative purposes. In some embodiments, certain components may be arranged differently or absent. Additional components may also be present. Included in computer 702 is system bus 704, whereby other components of computer 702 can communicate with each other. In certain embodiments, there may be multiple busses or components may communicate with each other directly. Connected to system bus 704 is central processing unit (CPU) 706. Also attached to system bus 704 are one or more random-access memory (RAM) modules 708. Also attached to system bus 704 is graphics card 710. In some embodiments, graphics card 710 may not be a physically separate card, but rather may be integrated into the motherboard or the CPU 706. In some embodiments, graphics card 710 has a separate graphics-processing unit (GPU) 712, which can be used for graphics processing or for general purpose computing (GPGPU). Also on graphics card 710 is GPU memory 714. Connected (directly or indirectly) to graphics card 710 is display 716 for user interaction. In some embodiments no display is present, while in others it is integrated into computer 702. Similarly, peripherals such as keyboard 718 and mouse 720 are connected to system bus 704. Like display 716, these peripherals may be integrated into computer 702 or absent. Also connected to system bus 704 is local storage 722, which may be any form of computer-readable media and may be internally installed in computer 702 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 724 is also attached to system bus 704 and allows computer 702 to communicate over a network such as network 726. NIC 724 can be any form of network interface known in the art, such as Ethernet, ATM, fiber, Bluetooth, or Wi-Fi (i.e., the IEEE 802.11 family of standards). NIC 724 connects computer 702 to local network 726, which may also include one or more other computers, such as computer 728, and network storage, such as data store 730. Generally, a data store such as data store 730 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 728, accessible on a local network such as local network 726, or remotely accessible over Internet 732. Local network 726 is in turn connected to Internet 732, which connects many networks such as local network 726, remote network 734 or directly attached computers such as computer 736. In some embodiments, computer 702 can itself be directly connected to Internet 732.

Although the disclosure has been described with reference to the embodiments illustrated in the attached drawing figures, it is noted that equivalents may be employed, and substitutions made herein without departing from the scope of the disclosure as recited in the claims.

Having thus described various embodiments of the disclosure, what is claimed as new and desired to be protected by Letters Patent includes the following:

1. A method of providing electronic reports by a single-action electronic report determining system, the method comprising:
   receiving a new report requirement;
   presenting, in a first user interface, a plurality of sub-applications based at least in part on the new report requirement, wherein each sub-application is defined as a data structure containing one or more cumulation data types, each cumulation data type having at least one data type cumulated for presentation in an electronic report;
   receiving, by the first user interface, selection of a sub-application from the plurality of sub-applications;
   presenting, in a second user interface, a plurality of cumulation data types that when selected, are to be included in the sub-application;
   receiving, by the second user interface, one or more selections of the plurality of cumulation data types to be included in the sub-application; and
   generating the electronic report based at least in part on the sub-application, the selected cumulation data types, and data types associated with the selected cumulation data types; and
   presenting at least one report of a first level of granularity, at least one summary report of a second level of granularity, and at least one totals report.

2. The method of claim 1, further comprising:
   receiving, by the second user interface, a sub-type of the electronic report to be analyzed; and
   generating the sub-application for the sub-type of the electronic report.

3. The method of claim 1, further comprising:
   receiving, by the second user interface, a time frame to be analyzed; and
   generating the sub-application for the time frame.

4. The method of claim 1, further comprising: dynamically updating a report title with text of the sub-application and updating an output heading with various identifiers.

5. The method of claim 1, further comprising:
   receiving a location designation to be analyzed; and
   generating the sub-application based on the location designation.

6. The method of claim 1, further comprising:
   receiving selection of outputs to be displayed in at least one report of a first level of granularity, at least one summary report of a second level of granularity, and at least one totals report; and
   displaying the outputs associated with the at least one report of the first level of granularity, the at least one summary report of the second level of granularity, and the at least one totals report.

7. The method of claim 1, wherein the at least one report of a first level of granularity, the at least one summary report of a second level of granularity, and the at least one totals report meet requirements of the new report requirement.

8. The method of claim 1, further comprising automatically selecting from the plurality of cumulation data types to be included in the sub-application.

9. One or more non-transitory computer-readable media storing computer-executable instruction that, when executed by a processor, perform a method of providing electronic reports by a single-action electronic report determining system, the method comprising:
   receiving a new report requirement;
   presenting, in a first user interface, a plurality of sub-applications based at least in part on the new report requirement, wherein each sub-application is defined as a data structure containing one or more cumulation data types, each cumulation data type having at least one data type cumulated for presentation in an electronic report;
   receiving, by the first user interface, selection of a sub-application from the plurality of sub-applications;
   auto-populating, on a second user interface, one or more cumulation data types to be included in the sub-application;
   generating, one or more selections of report data types associated with cumulation data types to be included in the sub-application; and
   generating the electronic report based at least in part on the sub-application, the one or more cumulation data types, and the one or more selections of report data types; and
   presenting at least one report of a first level of granularity, at least one summary report of a second level of granularity, and at least one totals report.

10. The one or more non-transitory computer-readable media of claim 9, wherein the report data types and the cumulation data types are based at least in part on a new requirement defined by a regulatory body or a client.

11. The one or more non-transitory computer-readable media of claim 9, further comprising:
   receiving, by the second user interface, a sub-type of the electronic reports to be analyzed; and
   generating the sub-application for the sub-type of the electronic reports.

12. The one or more non-transitory computer-readable media of claim 9, further comprising:
   receiving, by the second user interface, a time frame to be analyzed; and
   generating the sub-application for the time frame.

13. The one or more non-transitory computer-readable media of claim 9, further comprising:
   receiving a location designation to be analyzed; and
   generating the sub-application based on the location designation.

14. The one or more non-transitory computer-readable media of claim 9, further comprising: dynamically updating a report title with text of the sub-application and updating an output heading with various identifiers.

15. The one or more non-transitory computer-readable media of claim 9, further comprising:
   receiving selection of outputs to be displayed in at least one report of a first level of granularity, at least one summary report of a second level of granularity, and at least one totals report; and
   displaying the outputs associated with the at least one report of the first level of granularity, the at least one summary report of the second level of granularity, and the at least one totals report.

16. A single-action electronic report determining system for providing electronic reports, the system comprising:
   a data store;
   a processor; and one or more non-transitory computer-readable media storing computer-executable instructions that, when executed by the processor, perform a method of providing the electronic reports, the method comprising:

receiving a new report requirement from a regulatory body or a client;

presenting, in a first user interface, a plurality of sub-applications based at least in part on the new report requirement, wherein each sub-application is defined as a data structure containing one or more cumulation data types, each cumulation data type having at least one data type cumulated for presentation in an electronic report;

receiving, by the first user interface, selection of a sub-application from the plurality of sub-applications;

auto-populating, by a second user interface, one or more cumulation data types to be included in the sub-application;

generating one or more selections of report data types associated with cumulation data types to be included in the sub-application;

replacing at least one auto-populated cumulation data type with a selected cumulation data type; and generating the electronic report based at least in part on sub-application, the one or more cumulation data types, and the one or more selections of report data types; and presenting at least one report of a first level of granularity, at least one summary report of a second level of granularity, and at least one totals report.

17. The single-action electronic report determining system of claim 16, wherein the computer-executable instructions are further executed to perform:

receiving, by the second user interface, a sub-type of the electronic report to be analyzed;

receiving a location designation to be analyzed;

receiving, by the second user interface, a time frame to be analyzed; and generating the sub-application for the sub-type of the electronic report, the location designation, and the time frame.

18. The single-action electronic report determining system of claim 16, wherein the computer-executable instructions are further executed to perform: dynamically updating a report title with text of the sub-application and updating an output heading with various identifiers.

19. The single-action electronic report determining system of claim 16, wherein the computer-executable instructions are further executed to perform:

receiving selection of outputs to be displayed in at least one report for a first level of granularity, at least one summary report for a second level of granularity, and at least one totals report; and displaying the outputs associated with the at least one report for the first level of granularity, the at least one summary report for the second level of granularity, and the at least one totals report.

20. The single-action electronic report determining system of claim 16, wherein the computer-executable instructions are further executed to perform: comparing the report data and the cumulation data based on a plurality of periods.

* * * * *